(No Model.) 9 Sheets—Sheet 1.

A. M. HOFMANN.
PROCESS OF AND APPARATUS FOR PREPARING BEER, &c., IN RECEPTACLES FOR MARKET.

No. 531,314. Patented Dec. 25, 1894.

Fig. 1.

Witnesses:

Inventor:
Alves M. Hofmann
By Dyrenforth & Dyrenforth,
Attys.

(No Model.)

A. M. HOFMANN.
PROCESS OF AND APPARATUS FOR PREPARING BEER, &c., IN RECEPTACLES FOR MARKET.

No. 531,314.

Patented Dec. 25, 1894.

(No Model.) 9 Sheets—Sheet 4.

A. M. HOFMANN.
PROCESS OF AND APPARATUS FOR PREPARING BEER, &c., IN RECEPTACLES FOR MARKET.

No. 531,314. Patented Dec. 25, 1894.

Witnesses:
Chas. E. Gaylord,
Lute J. Alker.

Inventor:
Alves M. Hofmann,
By Dyrenforth & Dyrenforth
Attys.

(No Model.) 9 Sheets—Sheet 6.
A. M. HOFMANN.
PROCESS OF AND APPARATUS FOR PREPARING BEER, &c., IN RECEPTACLES FOR MARKET.

No. 531,314. Patented Dec. 25, 1894.

(No Model.) 9 Sheets—Sheet 7.
A. M. HOFMANN.
PROCESS OF AND APPARATUS FOR PREPARING BEER, &c., IN RECEPTACLES FOR MARKET.

No. 531,314. Patented Dec. 25, 1894.

(No Model.) 9 Sheets—Sheet 9.

A. M. HOFMANN.
PROCESS OF AND APPARATUS FOR PREPARING BEER, &c., IN RECEPTACLES FOR MARKET.

No. 531,314. Patented Dec. 25, 1894.

UNITED STATES PATENT OFFICE.

ALVES M. HOFMANN, OF CHICAGO, ILLINOIS.

PROCESS OF AND APPARATUS FOR PREPARING BEER, &c., IN RECEPTACLES FOR MARKET.

SPECIFICATION forming part of Letters Patent No. 531,314, dated December 25, 1894.

Application filed March 31, 1894. Serial No. 505,882. (No model.)

*To all whom it may concern:*

Be it known that I, ALVES M. HOFMANN, a citizen of the United States, residing at Chicago, in the county of Cook and State of Illinois, have invented a new and useful Improvement in Processes of and Apparatus for Preparing Beer and other Liquids in Receptacles for Market, of which the following is a specification.

It may be stated at the outset that I have primarily designed my improvement for the particular application to beer in barrels or kegs or in bottles, and I therefore, and for the sake of convenience, hereinafter confine the description of my invention in its application to racking, carbonating and bunging beer, though it is also applicable to, and I desire to be understood as intending it for, any and all liquids or beverages requiring similar treatment to prepare them in receptacles for the market.

A known manner of carbonating a beverage to prepare it for the market is to introduce into the holder containing it a liquid (preferably of the same kind) in small quantity proportionately to the quantity contained in the holder, but so highly charged with the gas, for which it affords a vehicle and a mixing or incorporating medium, as to supply the contents of the receptacle, and thoroughly impregnate them, with a charge of gas adequate for all requirements in the beverage.

I find that where the carbonating procedure referred to is employed on beer, the diffusion of the gas through the beer in the receptacle, however thoroughly it may be produced, is not lasting where the receptacle is not completely, or at least approximately, filled with the beer to be charged, which it rarely is; since the space left unfilled affords, as it were, a pocket, in which the gas tends to accumulate, and whence it quickly escapes on opening or venting the receptacle, leaving the beer, when poured or drawn for consumption, insufficiently carbonated. Incomplete filling of the receptacles is, perhaps, as likely of occurrence where the receptacles are glass bottles as where they are barrels or kegs, notwithstanding that the transparent nature of the former renders the matter of completely filling them readily accomplishable. This is probably because of general ignorance of the deteriorating consequence referred to being attributable to leaving the space, as stated. In bottling beer, however, the difficulty may, with an appreciation of the advantage in completely filling the bottles, be readily overcome owing to their transparency; while with barrels and kegs, because they are opaque, extraneous means of inspection must be provided to determine when they are full without requiring them to overflow to indicate that condition.

My process consists in withdrawing from a receptacle after filling it with beer (taken by preference directly from the ruh-cask) a suitably small proportion of its contents, and replacing the quantity thus withdrawn with an equal, or approximately equal, quantity of liquid highly charged with gas, thereby, practically, withdrawing the desired quantity from the receptacle, then charging it excessively with gas, and returning to the receptacle the same liquid, charged, that was withdrawn from it. Thus, after a receptacle has been completely filled, or substantially so, with the beer to be carbonated, (and complete filling of a barrel or keg is a matter as simple as filling a bottle) by withdrawing a certain quantity to make room for the charge, and replacing it with an equal or substantially equal quantity of the supercharged carbonating liquid, the desirably full condition of the receptacles is attained.

As an apparatus through the medium of which to practice my improved process, I have chosen for illustration a machine, of novel construction invented by me for the purpose, adapted for filling a keg with beer, then carbonating its contents in the manner stated, and finally sealing the receptacle. The machine, however, involves elements of patentable novelty irrespective of the particular carbonating use for which I have adapted it, and the principles employed in which it may be used with advantage whatever form of receptacle the machine may be adapted to operate on; and its racking and bunging functions are of great utility considered apart from any carbonating function.

Referring to the accompanying drawings—

A description of the general construction and mode of operation of the machine will tend to render the more readily comprehensible the details of construction and their particular functions hereinafter described; and following is such a general description:

A keg is seated upon an adjustable support with its bung-hole directly below and in alignment with a vertically adjustable filling tube, into which a beer-supply pipe leads, preferably from a ruh-cask, and also a pipe from a holder containing beer highly charged with carbonic acid gas, the pipes containing valves for controlling the flow through them; and the holder for the carbonating liquid also communicates with the filling-tube through a valve-controlled pipe having interposed in it a pump. The filling-tube is lowered deep into the keg through its bung-hole, when the keg-support is raised to force the keg tightly against the head through which the tube extends and produce a tight junction about the bung-hole between the keg and head; and the lowering of the tube actuates a bung-feed to move a bung adjacent to the tube to be afterward forced into the latter in alignment with a vertically reciprocable bung-driver therein. All is then ready for filling the keg, which is done by opening the valve in the beer-supply pipe, an operation performed by hand. This valve should be left open till the keg is completely filled, for ascertaining which a suitably arranged lantern or glass gage having a float-valve is provided, leading to a vent and in the passage to which lantern there is a shut-off valve coupled with that in the pipe leading to the pump to cause the two to be simultaneously and similarly operated. When the keg has been filled the supply is shut off and a clutch is manipulated to set the machinery in action to perform, successively, the following functions: First, to pump out of the keg a predetermined comparatively small portion of its contents and force it into the carbonating-liquid holder, wherein it is thoroughly mixed with its contents of highly charged beer and charged therein with gas; then to shut off the pump and glass-gage from the filling-tube and admit into the keg from the holder, through the filling-tube, by opening the valve in the pipe leading from the holder, beer carbonated to a high pressure and in quantity equaling, or approximately equaling, that withdrawn from the keg, when the supply is shut off; next to raise the filling-tube out of the keg and feed the bung over the bung-hole; then actuate a bung-driving rod in the filling-tube to descend forcibly against the bung and drive it; and finally to unclutch the mechanism from the driving-power, when, after lowering the keg-support and the keg, full of beer ready for the market, the machine is in condition for another operation. It may be stated that it requires less than a minute to thus place a barrel and fill it and carbonate its contents and bung the barrel by my machine.

The frame of the machine, as I have constructed it, is less than twelve feet high and four feet transversely in either direction, and is formed with four corner-posts or uprights $r$ on a bed and carrying bearings for the various parts of the mechanism.

Figures 2, 3, 4:
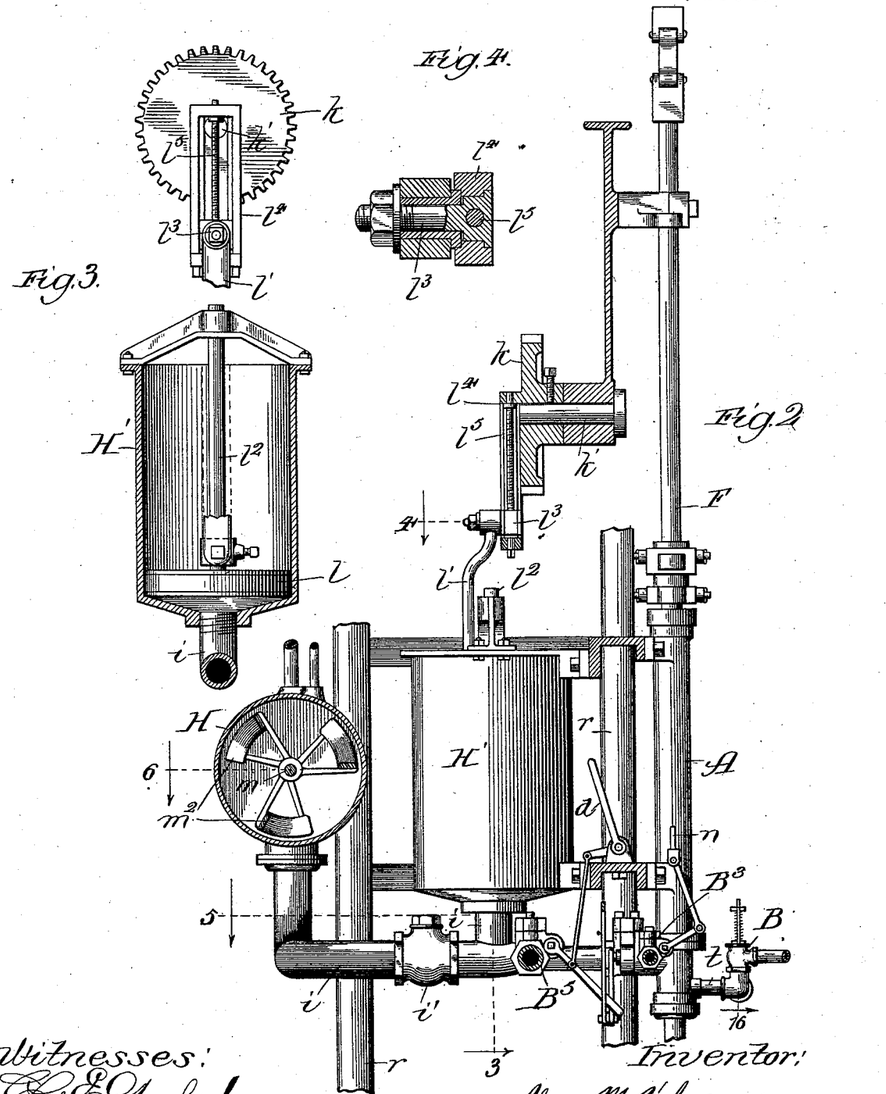
Fig. 2 is a broken section taken at the line 2 on Fig. 5 and viewed in the direction of the arrow.
Figs. 3, 4, 5 and 6 are broken sections taken, respectively, at the lines 3, 4, 5 and 6 on Fig. 2 and viewed as indicated by arrows.
Figure 16:
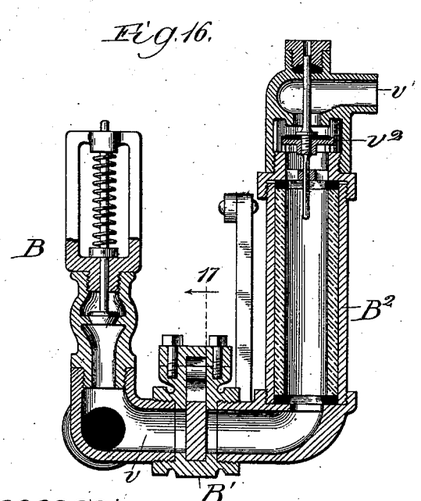
Fig. 16 is a section taken at the line 16 on Fig. 2, viewed in the direction of the arrow and enlarged.
Figure 17:
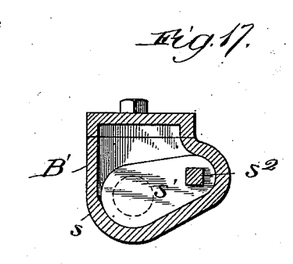
Fig. 17 is a section taken at the line 17 on Fig. 16 and viewed in the direction of the arrow to show the construction of a valve-detail.
Figure 18:
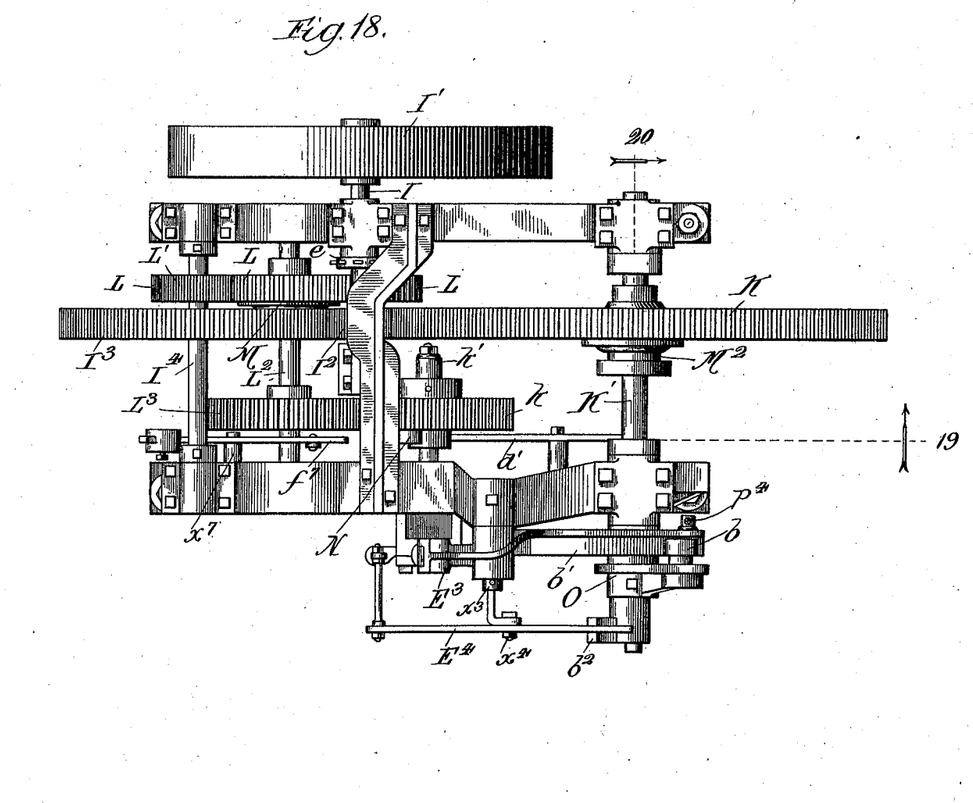
Fig. 18 is a top plan view of the gear-mechanism in the frame of the machine for actuating the various parts to perform their functions.
Figure 19:
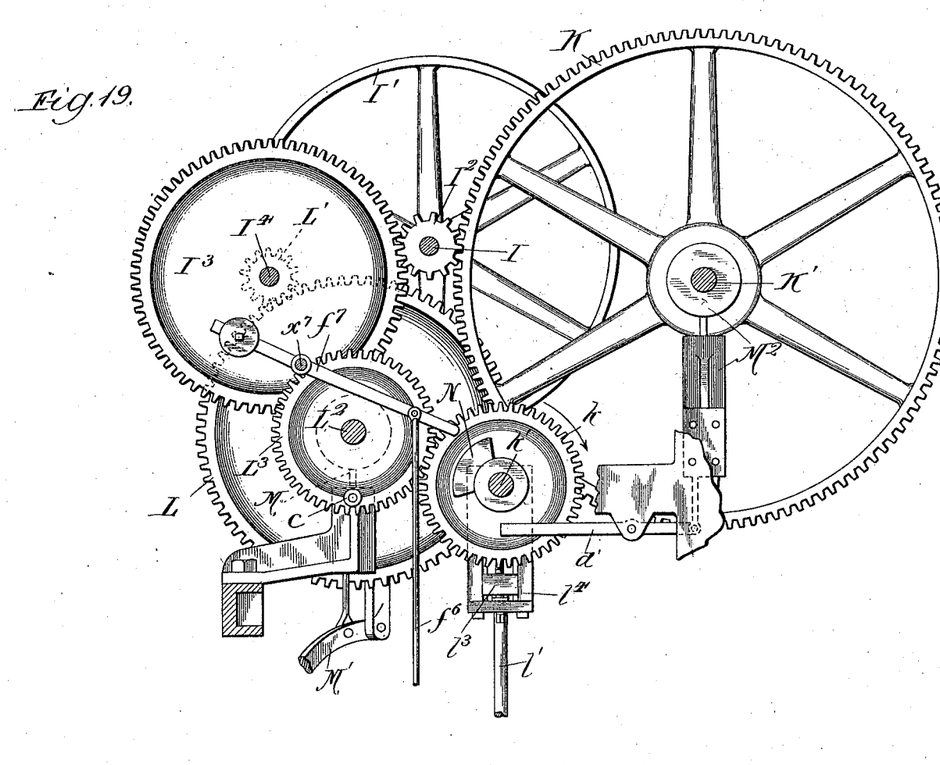
Figs. 19 and 20 are broken sections taken, respectively, at the lines 19 and 20 on Fig. 18 and viewed as indicated by arrows.

At the center of the front side of the machine is rigidly supported in vertical position in the frame a guide-sleeve A having fastened in the head at its lower end a soft-rubber gasket $q$. From the front of the sleeve A, near its lower end, there projects forward a short pipe-section $t$ (see Fig. 2) to a safety or "pop" valve B (see Fig. 16) and through a passage $v$ containing a shut-off valve B′ to a glass-gage or lantern B² having a float-valve $v^2$ near an outlet $v'$. The construction of the valve B′ is shown in Fig. 17 to involve a housing $s$ having pivotally supported in it on a stem $s^2$ a gate $s'$ adapted to be turned in opposite directions respectively to obstruct the passage $v$ and to open the same. Into one side of the tube A near its lower end, and just above the plane of the gasket, there opens a horizontally supported duct affording a bung-passage C (see particularly Figs. 11 and 14) containing a reciprocable rack-bar $p$ terminating at its inner end in a soft-rubber head $p'$, which snugly fits the passage and thus seals it; and into the passage C opens a bung-feeding tube C' supported thereon in vertical position, and containing the supply of bungs $C^2$, which feed successively by gravity into the path of the reciprocable head $p'$ in the passage C. A pinion-segment $p^2$ on one end of a bell-crank $p^3$, fulcrumed on the frame at $x$, meshes with the rack $p$, the opposite end of the bell-crank being pivotally connected by a rod $p^4$, slotted toward its lower end, with one end of a cam-lever D pivotally supported between its extremities, at $x'$, on the frame.

E is a hand-lever fulcrumed at one end on a bearing $w$, projecting from a side of the frame, and extending thence across the front thereof through the bifurcated portion of the rod $p^4$ and through a stationary slotted segmental guide E', having a notch near its upper end to be engaged by an ordinary spring-dog $u$ adapted to be actuated from the grip-end of the lever.

$E^2$ is a cam-lever fulcrumed to the frame near one side at $x^2$ and connected from between its ends by a link $y$ with the lever E between its extremities.

Figures 11, 12, 13, 14:
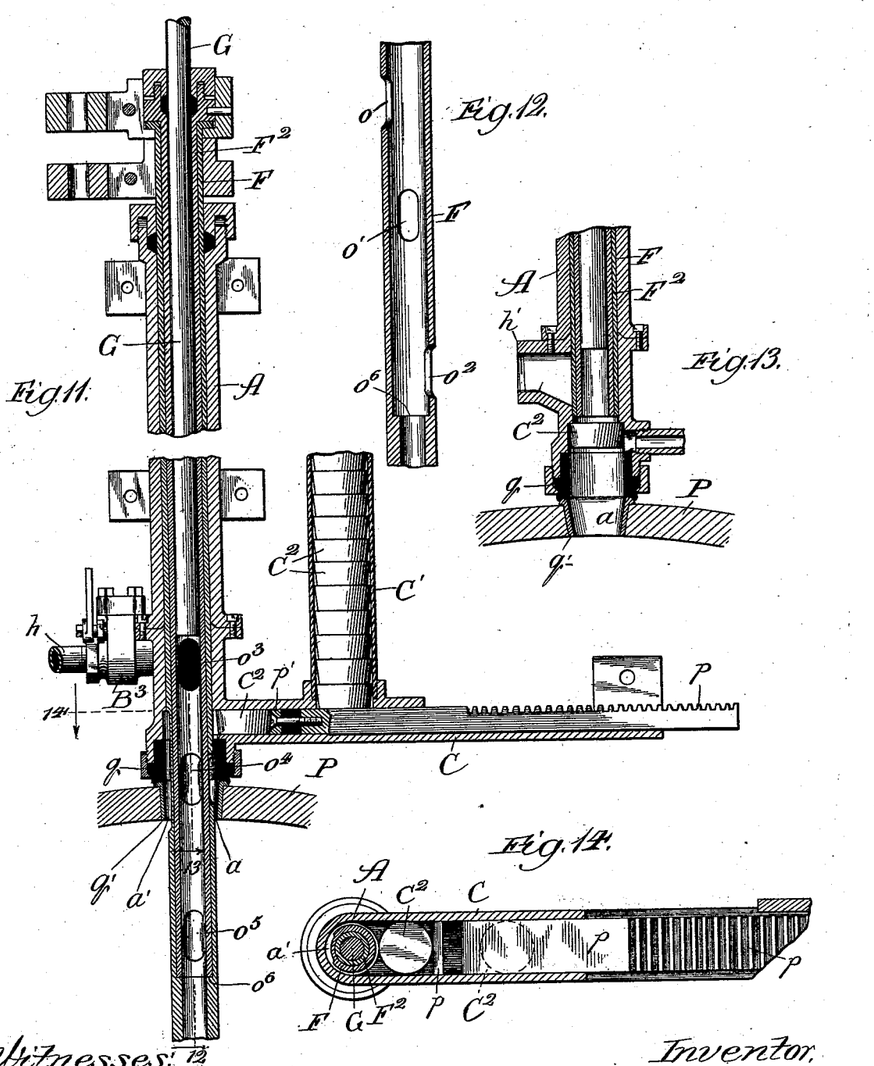
Fig. 11 is a broken section taken at the line 11 on Fig. 5 and viewed in the direction of the arrow, with a broken section of a keg represented in position.
Figs. 12, 13 and 14 are sections taken, respectively, at the lines 12, 13 and 14 on Fig. 11 and viewed as indicated by arrows.

F is the filling-tube extending through the guide-tube A, in which it is supported by the adjacent end of the cam-lever $E^2$ extending between a pair of collars $z$ adjustably fixed, by means of set-screws, on the filling-tube and having arm extensions $z'$ loosely surrounding a tube F', hereinafter described, to prevent turning of the filling-tube in being raised and lowered by the action of the lever $E^2$. The tube F is shown (see Fig. 12) to be provided with three ports or openings $o$, $o'$ and $o^2$ at different elevations and on successive quarters or longitudinal sections of its circumference, for use, respectively, in filling barrels, half-barrels and eighth-barrels, as hereinafter described; and to produce closure of the two of the ports not in use for filling, a supplemental filling-tube $F^2$, having three ports or openings $o^3$ $o^4$ and $o^5$, at different elevations and in alignment with each other, is provided, being sustained, as shown in Fig. 11, to extend inside the tube F, in which, near its lower end, is an offset $o^6$ to seat the lower end of the tube $F^2$. It may here be explained that whichever of its three ports the tube F is adjusted vertically to present to the mouth of the beer-supply pipe, or inlet in the head on the lower end of the sleeve A, it has to be turned axially, after loosening the collars $z$, to bring that port coincident with the one in the secondary tube $F^2$ on the same plane.

Inside the tube $F^2$ extends the stopper-driver shown as a bung-driving plunger-rod G on one end of a lever $E^3$ fulcrumed near its center to the frame at $x^3$ and having a rear cam-extension $b'$.

Figures 20, 21:
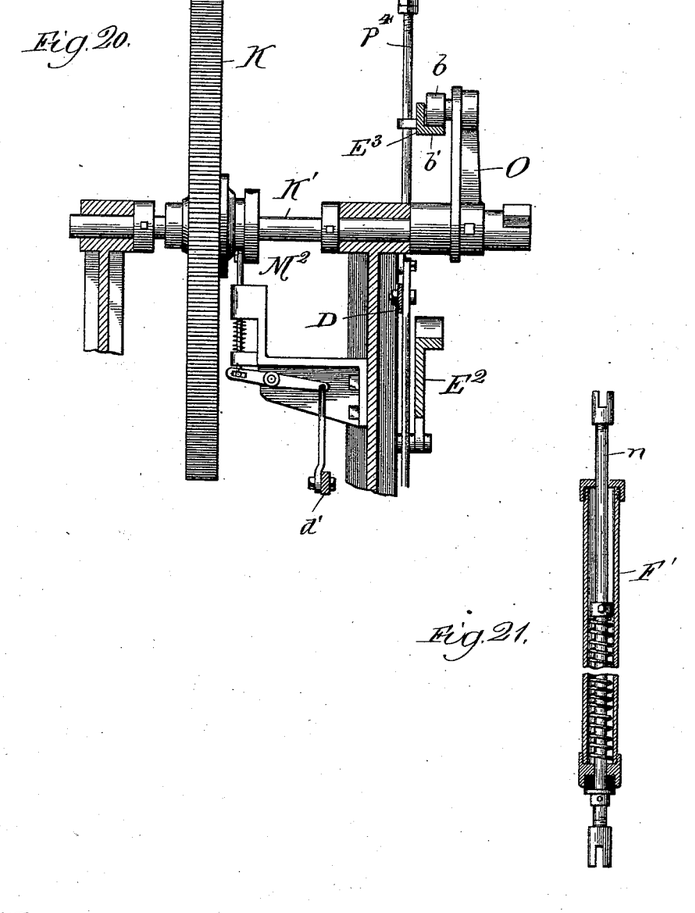
Fig. 21 is a broken view, enlarged over the scale observed in Fig. 1, and showing in section, the spring-controlled rod through which to actuate the valve, for controlling the flow to the keg of carbonating liquid from the supply-holder thereof.

The tube F' is stationarily supported in vertical position on the frame adjacent to the tube F and contains a spring-controlled valve-rod $n$ (see Fig. 21) pivotally connected at its upper extremity with one end of a lever $E^4$ fulcrumed near its center to the frame at $x^4$, the lower end being connected with the stem of the shut-off valve $B^3$ in the charging-liquid supply-pipe hereinafter described.

Figure 6:
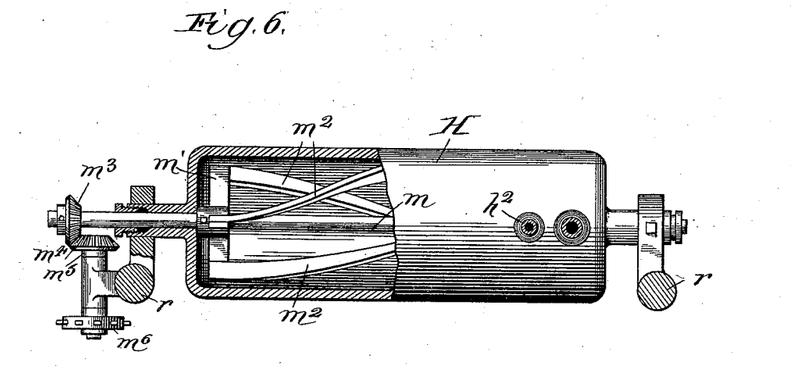
Figures 7, 8:
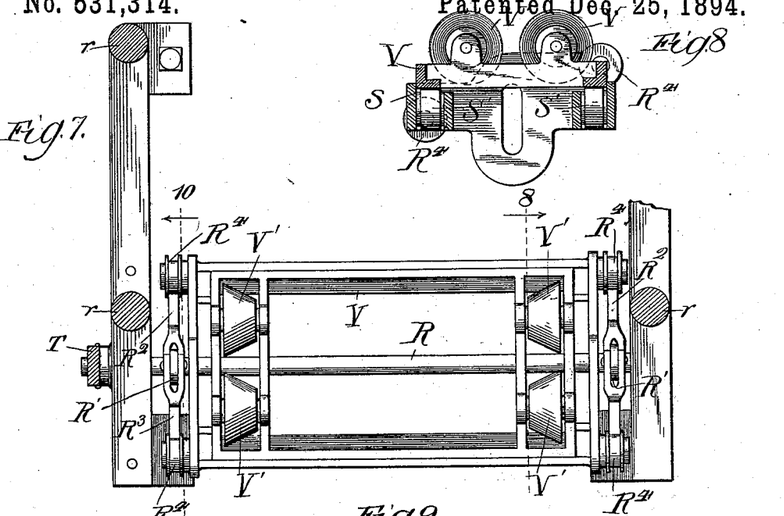
Fig. 7 is a section taken at the line 7 on Fig. 1, viewed in the direction of the arrow and showing a top view of the adjustable support for a keg or barrel while being filled, charged with gas and bunged by the machine.
Fig. 8 is a section taken at the line 8 on Fig. 7 and viewed in the direction of the arrow.
Figure 9:
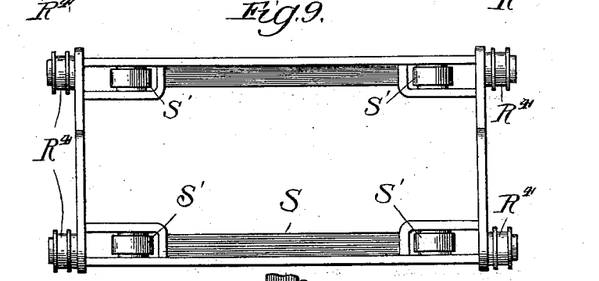
Fig. 9 is a plan view of the bottom frame of the keg or barrel support.
Figure 10:
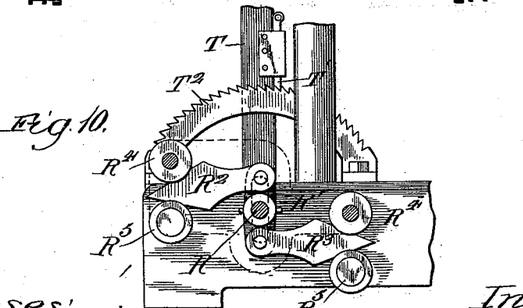
Fig. 10 is a section taken at the line 10 on Fig. 7 and viewed in the direction of the arrow.

At the rear side of the machine is supported in horizontal position the holder H for the supply of charging-liquid and containing a rotary shaft $m$ carrying heads $m'$ near its opposite ends in the holder (only one of which is shown, however, in Fig. 6); and between the heads extend the spirally arranged stirring-blades $m^2$. At one end the shaft $m$ carries a beveled gear $m^3$ meshing with a similar gear $m^4$ on one end of a short rotatably supported shaft $m^5$ carrying at its opposite end a sprocket-wheel $m^6$ geared to the driving mechanism of the machine as hereinafter described, whereby the contents of the holder H are constantly agitated to thoroughly impregnate the beer therein with the gas during the operation of the machine. The holder may be charged with gas through a pipe $h^2$ and is shown to be provided with a pressure-gage $h^3$.

Figure 5:
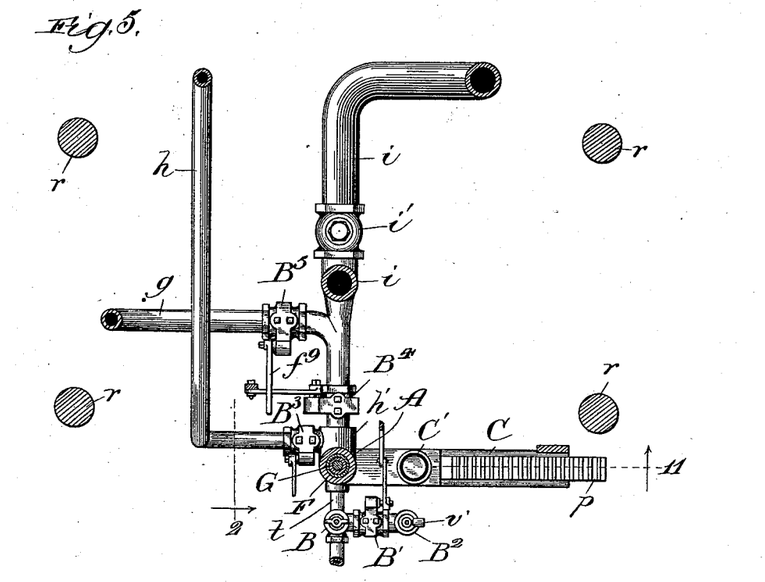

Between the holder H and the tube A is supported, in upright position, the pump H' (see Fig. 3) comprising a cylinder containing a piston $l$ having its rod $l'$ extended through the upper cylinder-head with a supplemental shorter guide-rod $l^2$, the rod $l'$ being pivotally connected with a stud $l^3$ on an adjusting screw $l^5$ working in a slotted head $l^4$ secured at its upper end to the rear side of a cog-wheel $k$ near its central shaft $k'$ journaled on the frame of the machine. The pump-cylinder communicates from its base through a pipe $i$ with the holder H at the bottom near one end of the latter, the pipe $i$ containing a backwardly opening check-valve (indicated at $i'$ in Fig. 5), whereby when the pump-piston is raised to suck from the keg the desired quantity of its contents (according to the extent of stroke of the pump gaged by setting the rod $l$ on the head $l^4$), the down-stroke of the pump-piston forces it past the check-valve $i'$ into the holder H. From the holder, near the end thereof opposite that at which the pipe $i$ enters, there proceeds a pipe $h$ into one side of a nose $h'$ at a side of the hollow head of the guide-tube A; and near the junction the pipe $h$ contains a valve $B^3$ like the valve B' and having its operating stem linked to the lower end of the spring-rod $n$ in the tube F', the upper end of which rod is pivotally connected with one end of the lever $E^4$.

Figure 15:
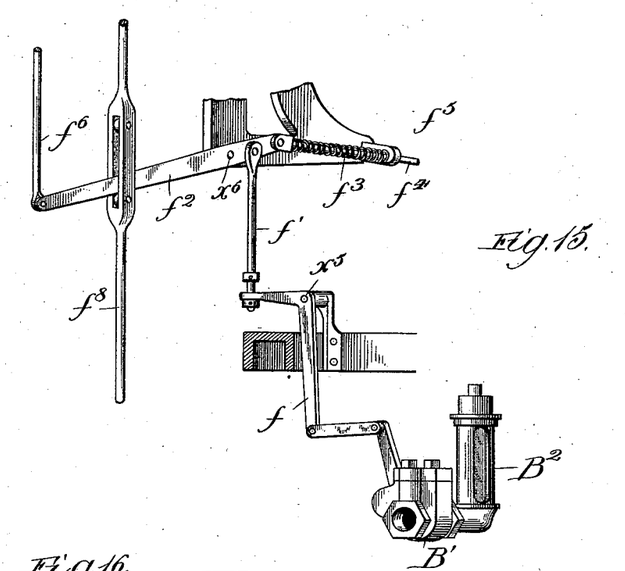
Fig. 15 is a broken perspective view, partly in section, showing valve-mechanism for controlling the flow of beer from the keg.

A beer-tube $g$, communicating at one end with the supply (ruh cask, not shown) leads at its opposite end into the pipe $i$ between its junction with the nose $h'$ (see Fig. 5) and the point of its communication with the pump; and shut-off valves $B^4$ and $B^5$, constructed like the valve B' are provided, respectively in the pipe $i$ near the nose $h'$ and in the pipe $g$ near its junction with the pipe $i$. The operating stem of the valve B' (see Fig. 15) is linked to the lower end of a bell-crank $f$, fulcrumed to the frame at $x^5$ and having its upper end adjustably connected by a link $f'$ with the short arm of a lever $f^2$ fulcrumed to the frame at $x^6$ and controlled from its short arm by a spring $f^3$ confined on a rod $f^4$ passing at one end loosely through a bearing $f^5$ on the frame and pivotally connected at its opposite end with the short arm of the lever $f^2$ near its end. The lever $f^2$ is connected from the end of its long arm by a link $f^6$ with one end of a lever $f^7$, weighted at its opposite end and fulcrumed between its extremities to the frame at $x^7$; and the lever $f^2$ extends to the link $f^6$ through a longitudinal slot in a rod $f^8$ supported to extend and reciprocate vertically and connected at its lower end with the operating handle of the valve B$^4$. The valve B$^5$ has a handle $f^9$ connected with its operating stem to adapt the valve to be opened and closed by hand to produce and shut off the flow of beer through the pipe $g$.

The gearing for actuating the parts of the mechanism thus described is supported at the upper end of the frame.

On the drive-shaft I, journaled in the frame, is the belt-wheel I', a sprocket-wheel $e$ connected with the sprocket-wheel $m^6$ on the shaft $m^5$ by a chain $e'$ passing over idlers $e^2$, $e^3$; and the pinion I$^2$ between the two gear-wheels K and I$^3$ respectively on rotary shafts K' and I$^4$. The shaft I$^4$ carries a pinion L' meshing with a gear-wheel L loose on a rotatable shaft L$^2$ and provided with an automatic spring-releasing clutch-device M of any suitable construction, that employed by me being well-known as the "Stiles" clutch, and therefore not illustrated in detail. The handle M' of the clutch M extends into conveniently accessible position with relation to the handle $d$ of the valve B$^5$. The shaft L$^2$ also carries a gear L$^3$ provided with an abutment $c$ at one side and meshing with the pump-actuating gear-wheel $k$, the latter carrying on its hub a cam N in the path of which extends the operating lever $d'$ of an ordinary self-releasing spring-clutch device M$^2$ for the gear-wheel K, which is normally loose on the shaft K'. Secured to the end of the shaft K' is the crank-arm O carrying an anti-friction roller $b$ at one side near its outer end, into the path of which projects the cam-extension $b'$ of the lever E$^3$, (see Fig. 20) connected by a collar with the upper extension of the bell-crank rod $p^4$; and at its hub-portion the arm O carries a cam $b^2$ to engage the end of the lever E$^4$ in its path.

The adjustable support for sustaining the keg P, while being filled, at the base of the machine, is shown in detail in Figs. 7 to 10, inclusive. On a rock-shaft R journaled to extend across the front of the base of the frame are fastened, near its opposite ends, the transversely extending heads R', from opposite ends of each of which project, in contrary directions, wedge-arms R$^2$ and R$^3$ between flanged rollers R$^4$ and R$^5$, one of the former being journaled near each corner of a rectangular frame S, having journaled on its upper side, near each corner, a roller S', adapted to turn parallel with the sides of the frame; and the rollers R$^5$ are journaled, to coincide each with a roller R$^4$, on the base of the frame of the machine. To one end of the shaft R is fastened an operating lever T carrying a spring-dog T' to engage an adjacently supported segmental rack T$^2$, from which the dog is releasable in a usual manner by gripping the lever-handle, whereby turning the lever in one direction forces the arms R$^2$, R$^3$ between the rollers R$^4$, R$^5$, thus raising the frame S, which is supported in its elevated position by engagement of the dog with the rack; and throwing the lever in the opposite direction withdraws the arms between the flanged rollers and permits the frame to lower by gravity.

On the frame S is imposed a rectangular carriage V, which seats on the rollers S' and may thus be readily shifted slightly lengthwise back and forth; and in its four corner-portions are journaled the inwardly tapering rollers V', which conform to the parts of a keg imposed upon them lengthwise of the carriage, a different length of which latter should be provided for each different size of the receptacle-barrel, half, quarter and eighth.

Figure 1:
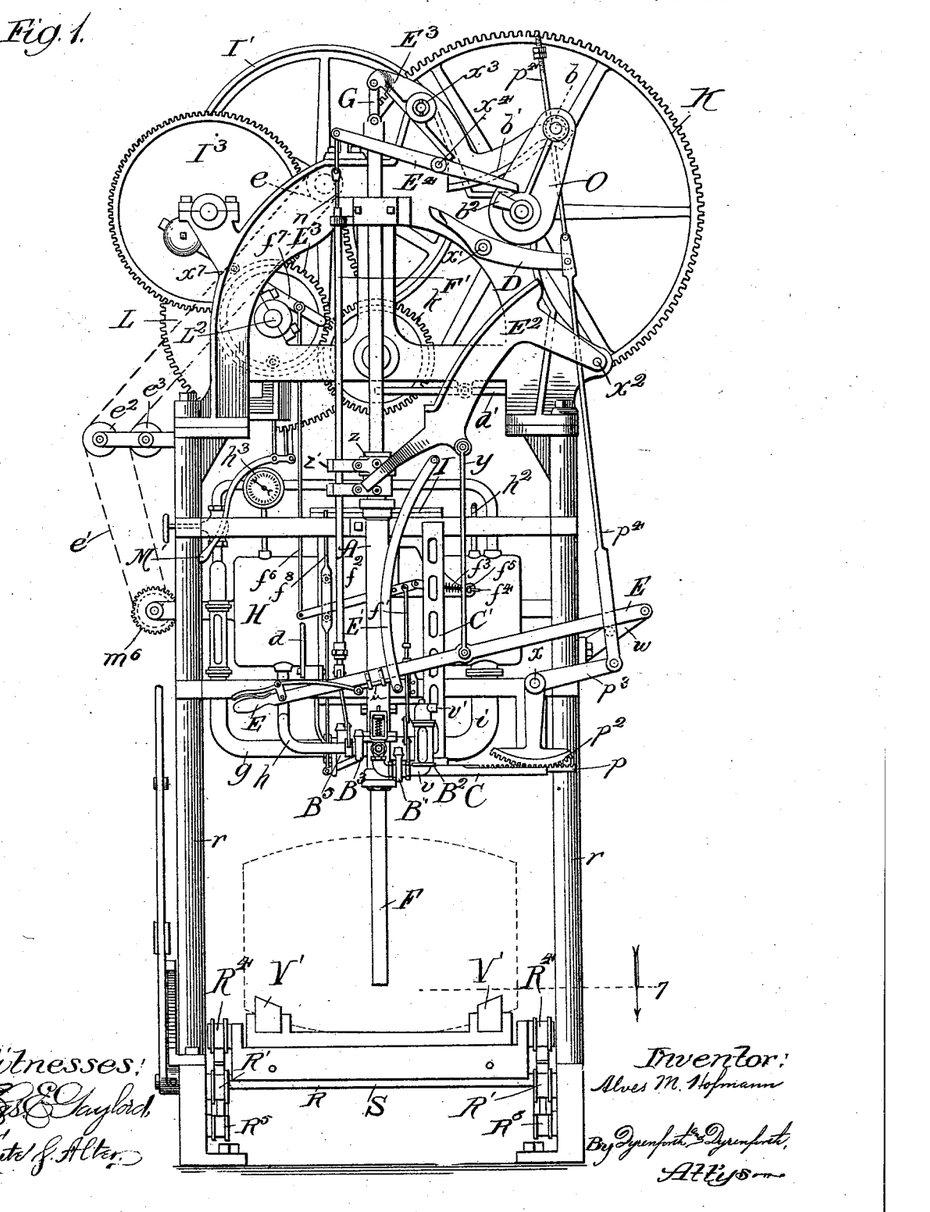
Figure 1 shows my improved machine by a view in front elevation.

The operation is as follows: A keg P being imposed on the carriage V, the frame S is raised, by turning the lever T, till it is pressed, about the bushing $q'$ in its bung-hole $a$, tightly against the rubber gasket $q$. The lever E is then pulled downward to the position in which it is illustrated in Fig. 1, thereby lowering the tube F through the bung-hole to cause it to reach nearly to the bottom of the keg, the lowering being effected by the pull against the lower collar $z$ exerted by the cam-lever E$^2$ through the medium of the link $y$. The rod $p^4$, where the lever E extends through its slotted portion, being some distance from the lever-fulcrum, the movement of the lever abuts it against the rod and pulls the latter slightly downward, causing it to turn the bell-crank $p^3$ to swing the pinion-segment sufficiently in the direction to actuate the rack $p$ to shove a bung C$^2$, in its path in the passage C, close to the inlet therefrom into the head of the tube A. The handle $d$ of the valve B$^5$ in the pipe $g$ is then manipulated to open the beer-supply pipe and permit the keg to fill with the flat beer from the rub-cask (not shown); and the valves B' and B$^4$ are also open. As the keg fills, the air in it escapes through a vent $a'$ in the side of the tube A where it is surrounded by the bung-hole, and which leads above the plane of the keg through the passage $v$ past the float-valve $v^2$ therein to the outlet $v'$. When the keg is quite full, the pressure of the liquid in the passage $v$ against the valve $v^2$ therein closes the latter. Then the handle $d$ is turned to shut off the flow through the pipe $g$. Meantime the shaft I is being continuously driven, with the only constant effect, however, (besides keeping the idle gears $I^2$, L, K, $I^3$ and L' in motion) of turning the sprocket-wheel $e$ to drive the stirrer-shaft $m$ in the agitator, or charged-beer holder, H. By now moving the clutch-handle M' to clutch the gear-wheel L to the shaft $L^2$, the rotating shaft I drives the shaft $I^4$ through the medium of the pinion L', thereby turning the pinion $I^2$ on shaft I to revolve the gear-wheel K idly on its shaft K' and the gear-wheel $L^3$ on the shaft $L^2$ to drive the gear-wheel $k$. A complete revolution of the gear $k$ raises the piston of the pump H' to withdraw into it a predetermined quantity of beer from the keg through the pipe $i$, and then lowers the piston to force the contents of the pump into the holder H; but before the downstroke of the pump begins, the projection $c$ on the gear-wheel $L^3$ strikes the weighted lever $f^7$ and slowly, at first, raises it to pull upward on the rod $f^6$, till the lost motion of the lever $f^2$ in the slot of the rod $f^8$ and in straightening with relation to the spring-rod $f^4$, has been expended, by which time the downstroke of the pump-piston will begin to discharge the contents of the pump into the holder H, when the lever $f^2$, by engaging the rod $f^8$ at the upper end of the slot therein, will suddenly close the valve $B^4$ and the spring-rod, having passed its alignment with the lever, will, by the resilient action of its spring $f^3$, bend suddenly downward at its junction with the lever, thereby actuating the connections $f'$ and $f$ with the handle of valve B' to close the latter. At the end of the upstroke of the pump the cam N on the shaft $k'$ of gear $k$ contacts with the lever $d'$ of the spring-clutch $M^2$ and causes it to engage the gear-wheel K with its shaft K' to rotate the latter through a complete revolution, whereby the arm O makes a complete revolution producing the following functions in succession: First the cam $b^2$ strikes the lever $E^4$ and depresses the rod $n$ to open the valve $B^3$, and admit a quantity of the charged liquid into the keg from the holder H through the pipe $h$, the cam being gaged to hold the valve open till the admitted charged liquid about equals in quantity that withdrawn by the pump, when the cam passes the lever $E^4$, which is returned to its normal position by the rise of the rod $n$ under the control of its spring to close the valve. Then the roller $b$ on the end of the crank-arm O engages the cam-lever $E^2$, thereby raising it on its pivot $x^2$ and withdrawing the tubes F, $F^2$ out of the keg and at the same time raising the lever E into its initial position wherein it is held by engagement of the dog $u$ with a notch in the upper end of the guide E'. Immediately after withdrawal of the filling-tube, the roller $b$ strikes the lever D, thereby causing depression of the rod $p^4$ to turn the bell-crank $p^3$ and actuate the rack to feed the bung in advance of the head $p'$ into the head of tube A, where it is below the driving-rod G, which is then actuated to drive the bung into the bung-hole of the keg by contact of the roller $b$ with the lever $E^3$, the connection of the cam-extension $b'$ of which with the rod $p^4$ raises the latter and actuates the bell-crank $p^3$ and its pinion-segment $p^2$ to withdraw the rack $p$ till its head $p'$ is in front of the bung-tube C', ready to act on another bung then fed by gravity into its path in the passage. At the end of a single revolution of the gears K and L their clutches are actuated by their respective springs to unclutch them from their shafts, when the gear-mechanism stops, leaving only the shaft I and belt-wheel I' and gears $I^2$, $I^3$, L', L and K and shaft $I^4$ idly in motion.

What I claim as new, and desire to secure by Letters Patent, is—

1. The process of preparing carbonated liquid in a package for the market, which consists in first filling the receptacle with the uncarbonated liquid, then withdrawing therefrom a portion of its contents, supplanting the withdrawn liquid with liquid highly charged with gas, and finally sealing the package, substantially as described.

2. The process of preparing carbonated liquid in a package for the market, which consists in first filling the receptacle with the uncarbonated liquid, then withdrawing therefrom a portion of its contents and storing and charging with gas the withdrawn portion, returning into the receptacle and mixing with its contents a quantity of such stored and charged liquid, and finally sealing the package, substantially as described.

3. The process of filling a receptacle with liquid and charging its contents with gas, which consists in introducing the liquid to be charged into the receptacle till it is completely full, or approximately so, then withdrawing therefrom a predetermined portion of its contents, and introducing into the receptacle a quantity, substantially equal to that withdrawn, of liquid highly charged with gas, substantially as described.

4. The process of filling a receptacle with liquid and charging its contents with gas, which consists in introducing the liquid to be charged into the receptacle till it is completely full, or approximately so, then withdrawing therefrom a predetermined portion of its contents and storing the withdrawn liquid and charging it with gas, and returning into the receptacle and mixing with its contents a quantity of such stored and charged liquid, substantially as described.

5. In an apparatus for racking beer and other liquids into receptacles and charging their contents with gas, a filling tube, into which the liquid-supply pipe leads, reciprocably adjustable to insert it, at one end, into and withdraw it from a receptacle a pump exhaustively communicating with the filling-tube, to withdraw from said receptacle liquid by the same passage in the filling-tube through which it entered the receptacle a holder for the supply of gas-charged liquid, communicating with said tube, and automatic actuating means operating successively to work the pump to withdraw liquid through the tube, and discharge charged liquid from said holder through the tube, substantially as described.

6. In an apparatus for racking beer and other liquids into receptacles and charging their contents with gas, a filling-tube into which the liquid-supply pipe leads, reciprocably adjustable to insert it, at one end, into and withdraw it from a receptacle a holder for the supply of gas-charged liquid communicating with the filling-tube, a pump communicating with the tube and holder, to withdraw from said receptacle liquid by the same passage in the filling-tube through which it entered the receptacle and automatic actuating means operating successively to work the pump to withdraw a predetermined quantity of liquid through the tube and discharge it into said holder, and discharge from the latter a predetermined quantity of its charged contents through the tube, substantially as described.

7. In an apparatus for racking beer and other liquids into receptacles and charging their contents with gas, a reciprocably supported filling-tube into which the liquid-supply pipe leads, a pump exhaustively communicating with the filling-tube, a holder for the supply of gas-charged liquid communicating with said tube, a bung-feed leading into the tube, a bung-driver, and automatic actuating means operating successively to work the pump to withdraw liquid through the tube and discharge it into the holder, discharge liquid from said holder through the tube, raise the filling-tube, feed a stopper into position to be driven and drive the stopper, substantially as described.

8. In an apparatus for racking beer and other liquids into receptacles, a reciprocable filling-tube for a receptacle, a stationary head in which the filling-tube is supported and through which the liquid-supply pipe leads into the filling-tube and a stopper-driver reciprocably supported in and movable independently of said tube, substantially as described.

9. In an apparatus for racking beer and other liquids into receptacles, a filling-tube reciprocably supported to be inserted into and withdrawn from a receptacle and longitudinally adjustable to regulate the extent of its insertion, an inlet for the liquid in the tube-support, and openings at different points along the filling-tube registrable by its adjustment one at a time with said inlet according to the size of the receptacle or depth to which the tube shall be inserted therein, substantially as described.

10. In an apparatus for racking beer and other liquids into receptacles, a filling-tube reciprocably supported to be inserted into and withdrawn from a receptacle and longitudinally adjustable to regulate the extent of its insertion and rotatably adjustable on its support, an inlet for the liquid in the tube-support, openings at different points along the filling-tube in different longitudinal sections thereof, and a supplemental tube in and longitudinally movable with said filling-tube and having aligning openings facing the plane of said inlet, whereby the filling-tube and its contained tube may be adjusted lengthwise to bring either opening in the latter coincident with the inlet and the filling-tube may be turned to present its corresponding opening to the inlet, while the inner tube closes the other openings in the filling-tube, substantially as described.

11. In an apparatus for racking beer and other liquids into receptacles, a filling-tube reciprocably supported to be inserted into and withdrawn from a receptacle and longitudinally adjustable to regulate the extent of its insertion and rotatably adjustable on its support, an inlet for the liquid in the tube-support and a stopper-insertion opening therein, openings at different points along the filling-tube in different longitudinal sections thereof, a supplemental tube in and longitudinally movable with said filling-tube and having aligning openings facing the plane of said inlet, a stopper-driver reciprocably supported in said supplemental tube and a stopper-feed communicating with the stopper-insertion opening, substantially as described.

12. A barrel or keg support for sustaining and reciprocably adjusting the barrel or keg with relation to the filling-tube of a beer-racking apparatus, said support comprising a bed having journaled in it a rock-shaft R provided with an operating handle and rollers $R^5$, a frame S carrying rollers $R^4$ to coincide with the rollers $R^5$, and heads $R'$ on the shaft, each carrying at its opposite ends wedge-arms extending in contrary directions between adjacent rollers $R^4$, $R^5$, whereby turning the shaft extends or withdraws the wedge-arms between said rollers to raise or lower the frame, substantially as described.

13. A barrel or keg support for sustaining and reciprocably adjusting the barrel or keg with relation to the filling-tube of a beer-racking apparatus, said support comprising a vertically reciprocable frame on a base and provided with means for reciprocating it, and with rollers journaled near its corner-portions to revolve parallel with the sides of the frame, and a carriage for the keg or barrel resting in the frame on said rollers, substantially as described.

14. A barrel or keg support for sustaining and reciprocably adjusting the barrel or keg with relation to the filling-tube of a beer-racking apparatus, said support comprising, in combination, a bed having journaled in it rollers $R^5$, a rock-shaft R provided with an operating handle and means for securing and releasing it, a frame S carrying rollers $R^4$, to coincide with the rollers $R^5$, and rollers $S'$, heads $R'$ on the shaft, each carrying at its opposite ends wedge-arms extending in contrary directions between adjacent rollers $R^4$, R⁵, whereby turning the shaft extends or withdraws the wedge-arms between said rollers to raise or lower the frame, and a carriage V carrying tapered rollers V' and seated in the frame S on the rollers S', substantially as described.

15. In an apparatus for racking beer and other liquids into receptacles and bunging the latter, the combination with the frame of a guide or sleeve provided with an inlet, a vertical filling-tube reciprocably supported in said guide and also provided with an inlet adapted to register with said first-mentioned inlet in the guide, a bung-driver reciprocably supported in said tube, a bung-feed leading laterally into the guide, and driving-means operating to successively raise the filling-tube, actuate the bung-feed to introduce a bung into said guide and the bung-driver to drive said bung, and finally restore the bung-feed to its initial condition, substantially as described.

16. In an apparatus for racking beer and other liquids into receptacles and bunging the latter, the combination with the frame of a vertical filling-tube reciprocably supported in a guide provided with an inlet leading into the tube, a cam-lever engaging the filling-tube, a bung-feed leading into said guide, a bung-driver reciprocably supported inside said tube, a cam-lever connected at opposite sides of its fulcrum respectively with the bung-driver and bung-feed, a rotatably supported crank-arm, a cam-lever free at one end and at its opposite end engaging the bung-feed, and driving-mechanism with which said crank-arm is geared to be revolved and engage at different points in its path said filling-tube-lever to raise the tube, said cam-lever to operate the feed and said bung-driver lever to actuate the bung driver and restore the bung-feed to its initial condition, substantially as described.

17. In an apparatus for racking beer and other liquids into receptacles and bunging the latter, the combination with the frame of a vertical filling-tube reciprocably supported in a guide provided with an inlet leading into the tube, a cam-lever engaging the filling-tube, a bung-feed comprising a rack-bar having a head reciprocably confined in a passage leading into said guide, a bell-crank having at one end a pinion-device and connected at its other end with an operating rod, a bung-driver reciprocably supported inside said tube, a cam-lever connected at opposite sides of its fulcrum, respectively with the bung-driver and said rod, a cam-lever connected at one end with said rod below the bung-driver lever, a rotatably supported crank-arm, and driving-mechanism with which said crank-arm is geared to be revolved and engage successively said filling-tube lever to raise the tube, said rod-lever to actuate the bung-feed in one direction and said bung-driver lever to actuate the bung-driver and the bung-feed in the opposite direction, substantially as described.

18. In an apparatus for filling a receptacle with beer or other liquid and charging its contents with gas, the combination with the frame of a vertical filling-tube reciprocably supported in a guide provided with an inlet leading into the tube, a holder for charged liquid having a pipe-connection with said inlet containing a shut-off valve normally closed by a spring-rod, a bung-driver reciprocably supported in said tube, a bung-feed leading into the guide, and driving-means operating to successively open, temporarily, said valve, raise the filling-tube, actuate the bung-feed to introduce a bung into said guide and the bung-driver to drive said bung, and finally restore the bung-feed to its initial condition, substantially as described.

19. In an apparatus for filling a receptacle with beer or other liquid and charging its contents with gas, the combination with the frame of a vertical filling-tube reciprocably supported in a guide provided with an inlet leading into the tube, a holder for charged liquid having a pipe-connection with said inlet containing a shut-off valve normally closed by a spring-rod, an agitator in said holder, a bung-driver reciprocably supported in said tube, a bung-feed leading into the guide, and driving-means operating to successively open, temporarily, said valve, raise the filling-tube, actuate the bung-feed to introduce a bung into said guide and the bung-driver to drive said bung, and finally restore the bung-feed to its initial condition, substantially as described.

20. In an apparatus for filling a receptacle with beer or other liquid and charging its contents with gas, the combination with the frame of a vertical filling-tube reciprocably supported in a guide provided with an inlet leading into said tube, a holder for charged liquid having a pipe-connection with said inlet containing a shut-off valve normally closed by a spring-rod, a bung-driver reciprocably supported in said tube, a pump communicating with the filling-tube and discharging into said holder, a shut-off valve in communication between the pump and tube, a bung-driver reciprocably supported in said tube, a bung-feed leading into the guide, and driving-means operating to successively actuate the pump, shut off the valve in the passage to the pump and temporarily open that controlling the flow from the holder, raise the filling-tube, actuate the bung-feed to introduce a bung into said guide and the bung-driver to drive said bung, and finally restore the bung-feed to its initial condition, substantially as described.

21. In an apparatus for filling a receptacle with beer or other liquid and charging its contents with gas, the combination with the reciprocable filling-tube, charged-liquid holder controllably communicating therewith and their actuating-means, of a pump communicating with the tube and holder and having its piston-rod adjustably connected with said driving-means to regulate its stroke, substantially as described.

22. In an apparatus for filling a receptacle with beer or other liquid and charging its contents with gas, the combination with the reciprocable filling-tube, charged-liquid holder controllably communicating therewith and their actuating means, of a pump communicating with the tube and holder, a head on which the piston-rod of the pump is adjustably pivoted, and a rotatably-supported cog-wheel in gear with said actuating means and carrying said head to rotate with it, substantially as described.

23. In an apparatus for filling a receptacle with beer or other liquid and charging its contents with gas, the combination with the frame of a vertical filling-tube reciprocably supported in a guide provided with a gasket $q$, and having an inlet leading into said tube and an outlet, a lantern $B^2$ having an outlet $v'$ and provided with a float-valve $v^2$ and communicating with said guide-outlet through a passage $v$ containing a valve $B'$ and provided with a safety-valve $B$, a holder for charged liquid having a pipe connection with said inlet containing a valve $B^3$ normally closed by a spring-rod, a vent $a$ leading from between the gasket and tube into said passage $v$, a bung-driver reciprocably supported in said tube, a pump communicating with said holder and guide-inlet through a pipe $i$ containing a valve $B^4$ and a check-valve, a connection between valves $B'$ and $B^4$ having an actuating rod $f^6$ extending upward from it, a bung-feed leading into the guide, and driving-means operating to successively actuate the pump, shut off valves $B'$ and $B^4$ through the rod $f^6$ and temporarily open valve $B^3$ through said spring-rod, actuate the bung-feed to introduce a bung into said guide, and finally restore the bung-feed to its initial condition, substantially as described.

24. In an apparatus for filling a receptacle with beer or other liquid and charging its contents with gas, the combination with the frame of a guide-sleeve A terminating in a hollow head having an inlet and an outlet and containing a gasket $q$ and a reciprocably supported filling-tube, a bung-driver G in said tube, a pipe $g$ leading to said inlet and containing a valve $B^5$, a charged-liquid holder H communicating with said inlet through a pipe $h$ containing a valve $B^3$ having a spring-rod connection, a pump H' communicating with said holder and inlet through a pipe $i$ containing a check-valve $i'$ and a valve $B^4$, a bung-feed having its bell-crank $p^3$ connected with a bifurcated rod $p^4$, a cam-lever $E^2$ engaging the filling-tube, a hand-lever E linked to said cam-lever, a cam-lever D engaging the rod $p^4$, a lever $E^3$ engaging at opposite ends the bung-driver and rod $p^4$, a lever $E^4$ engaging said spring-rod, a lever $f^7$ connected with rod $f^6$, and a train of driving-gears, one of said gears carrying an abutment $c$ and another of said gears carrying a cam N to engage a clutch-device $M^2$ on a shaft K' carrying the gear-wheel K, and a crank-arm O and a cam $b^2$ on said shaft, the whole being constructed and arranged to operate substantially as described.

ALVES M. HOFMANN.

In presence of—
M. J. FROST,
W. G. WILLIAMS.